United States Patent [19]
Kuck et al.

[11] 3,813,745
[45] June 4, 1974

[54] DUAL TURRET LATHE

[75] Inventors: Kermit T. Kuck; Nagle V. Gushing, both of Sidney, Ohio

[73] Assignee: The Monarch Machine Tool Company, Sidney, Ohio

[22] Filed: Sept. 16, 1971

[21] Appl. No.: 180,969

[52] U.S. Cl. .................................... 29/36, 29/47
[51] Int. Cl. ............................................ B23b 3/18
[58] Field of Search ............ 29/36, 27 R, 27 C, 54, 29/564, 39; 82/2 D

[56] References Cited
UNITED STATES PATENTS

| | | | |
|---|---|---|---|
| 683,592 | 10/1901 | Bullard, Jr. | 82/2 D X |
| 2,384,809 | 9/1945 | Bullard et al. | 29/36 |
| 3,124,985 | 3/1964 | Curtis et al. | 82/2 D |
| 3,343,243 | 9/1967 | Renker | 29/57 X |
| 3,486,209 | 12/1969 | Shultz et al. | 29/27 C |

Primary Examiner—Gil Weidenfeld
Attorney, Agent, or Firm—Woodling, Krost, Granger & Rust

[57] ABSTRACT

A turret lathe is disclosed having a first turret mounted on generally vertical slides to carry end working tools for the workpiece and having a second turret mounted on separate slides in a horizontal movement plane to carry side working tools. The envelopes of movement of the turrets do not interfere with each other permitting simultaneous cutting by tools in each of the two turrets. Numerical control is employed on both turrets for control of speed, feed and tool selection with full contouring and thread cutting capabilities. The foregoing abstract is merely a resume of one general application, is not a complete discussion of all principles of operation or applications, and is not to be construed as a limitation on the scope of the claimed subject matter.

10 Claims, 4 Drawing Figures

INVENTORS.
KERMIT T. KUCK
NAGLE V. GUSCHING
ATTORNEYS.

INVENTORS,
KERMIT T. KUCK
BY NAGLE V. GUSCHING

Woodling, Krost,
Granger and Rust
ATTORNEYS.

DUAL TURRET LATHE

BACKGROUND OF THE INVENTION

Turret lathes have a tool holding turret permitting use of a plurality of tools working successively on a workpiece in the spindle. The typical turret lathe has the turret mounted on an axis perpendicular to the spindle axis on a cross slide on a carriage for movement of the turret in two paths in a plane containing the spindle axis. A ram type turret lathe is a simplification eliminating the cross slide with the ram or carriage moving the turret only along the spindle axis. It has been proposed as long as 75 years ago to add an additional cross slide on a turret lathe for side working tools on the periphery of the workpiece. A predecessor of this is nearly 100 years old showing a cam operated lathe with front and rear tools on a cross slide and a ram operated drill or tool on the carriage for axial working on the workpiece. Also, indexable toolholder turrets have been proposed for a cross slide on a lathe.

It has additionally been proposed to use a turret lathe with a carriage and a cross slide which carries not only a first plural tool holding turret but also a second plural tool holding turret on the same cross slide. This prevents interference between the tools of the two turrets because the turrets are both journaled on the same cross slide. This adds additional tools which may be brought into use on the workpiece but the tools may be used only in sequence, not simultaneously. Additionally, the cutting plane of the tools in the two turrets is the same and inherently so because both turrets are mounted on the same cross slide and carriage.

Another proposal has been to use two turrets, one on a first carriage and slide, another on a second carriage and slide, but both turrets moving in the same cutting plane, because the two carriages move on the same ways. With this arrangement, it has been found to be impractical to use short toolholders on the main turret and instead, along toolholders on the main turret are required in order to extend past the interfering position of the other turret in order to work on the workpiece. These long toolholders have resulted in a considerably less rigid support for the tool tip and to compensate for this, the turrets have had to be large and massive, thus slowing down the indexing movements and the cycle time of the machine as well as contributing to the excess deflection of the tool tip during cutting to result in a less accurate lathe. It has also been proposed to utilize a turret on two slides for motion in a first plane and a single tool mounted on another pair of slides for motion in a second plane. Such single tool could be moved under automatic initiation of the cycle of operation, which however, was a fixed cycle controled by stops and switches and was not fully automatically controled by the currently used numerical control. This numerical control, for example, uses punched paper tape to control spindle speed, feed rate, selection of tool in the turret and contouring along two paths or axes at the same time or thread cutting operations.

Accordingly, an object of the invention is to obviate the above-mentioned disadvantages.

Another object of the invention is to provide two independently moved turrets in two different planes on a turret lathe.

Another object of the invention is to provide two fully automatically controlled turrets on a turret lathe.

Another object of the invention is to provide two turrets on a turret lathe and journaled on non-parallel axes with one turret primarily for end-working and the other turret primarily for side-working of the workpiece, without interference of the envelopes of movement of the turrets yet permitting simultaneous cutting by a tool in each turret.

Another object of the invention is to provide a turret lathe with a first turret movable in a first plane and a second turret independently movable in a second plane.

Another object of the invention is to provide a turret lathe with first and second tool holding turrets operating in different planes and simultaneously independently movable.

SUMMARY OF THE INVENTION

The invention may be incorporated in a turret lathe, comprising in combination, a frame, a headstock journaling a spindle about a spindle axis on said frame, chuck means to grip a workpiece for rotation with said spindle, first and second tool carrying turrets journaled for indexing about first and second turret axes, respectively, first means mounting said first turret for movement on said frame in a first plane containing said spindle axis, second means mounting said second turret for movement on said frame in a second plane containing said spindle axis, said first and second planes intersecting at an angle, the indexing movement of said first turret and the movement thereof in said first plane establishing a first turret movement envelope, the indexing movement of said second turret and the movement thereof in said second plane establishing a second turret movement envelope, and means limiting movement in said second plane of said second turret for elimination of interference with each other of said turret movement envelopes.

Other objects and a fuller understanding of the invention may be had by referring to the following description and claims, taken in conjunction with the accompanying drawing.

DESCRIPTION OF THE PREFERRED EMBODIMENT

Figure 1:
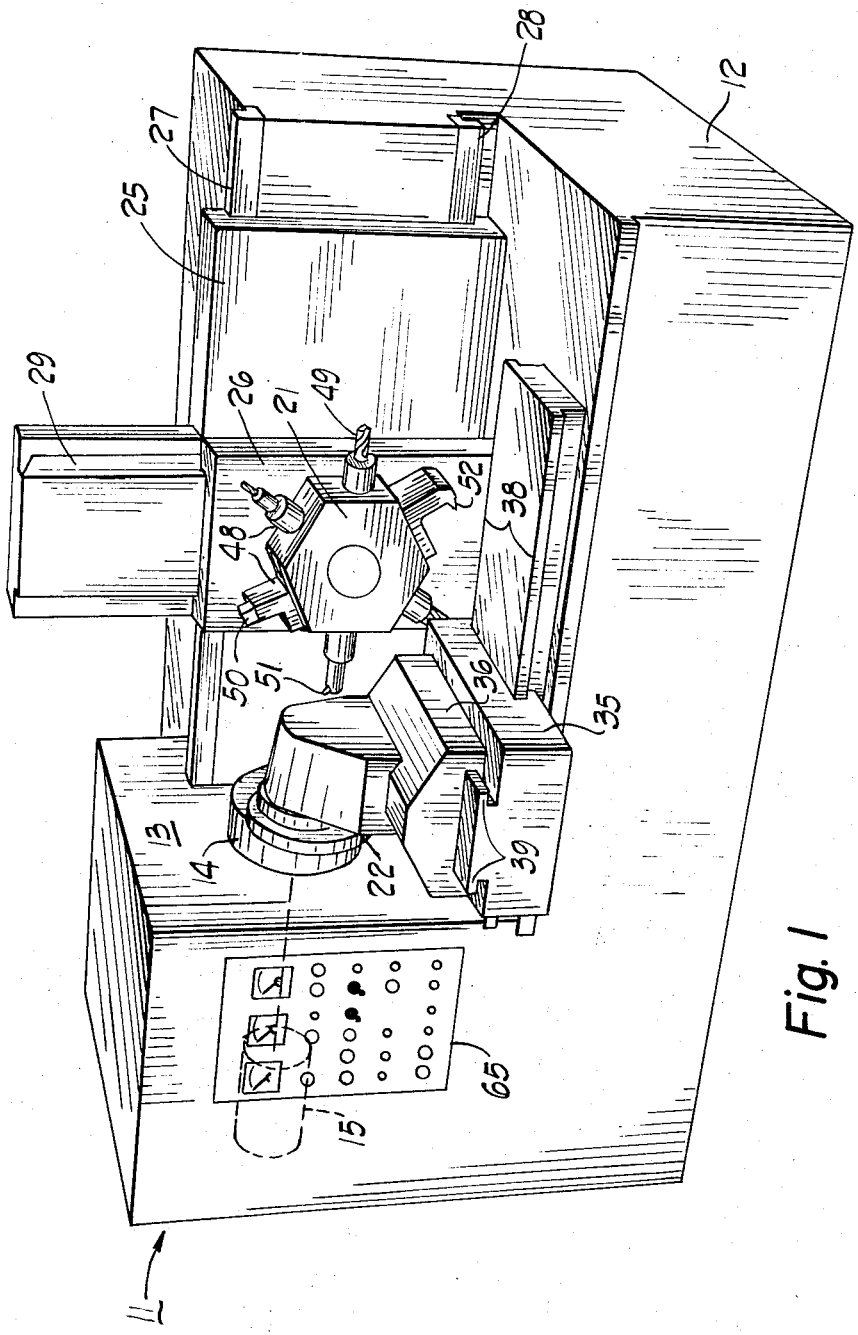
FIG. 1 is a perspective view of a lathe embodying the invention.

FIG. 1 illustrates a turret lathe 11 in which the invention is embodied. This turret lathe has a frame 12 with a headstock portion 13 of the frame journaling a spindle 14. The spindle is driven from a variable speed motor 15 for rotation about a spindle axis 16. The spindle has a collet, or a chuck 17 as shown, to grip a workpiece 18 for rotation with the spindle. This may be a bar extending through the hollow spindle, or as shown, may be a chucking type of machine to chuck individual workpieces.

First and second toolholding turrets 21 and 22 are provided on the lathe 11. These turrets are journaled for indexable rotation around first and second turret axes 23 and 24, respectively. A first means is provided to mount the first turret for movement on the frame 12 in a first plane containing the spindle axis 16. In this preferred embodiment the first plane is vertical or nearly so, and is provided by a first carriage 25 and a first cross slide 26. The first carriage 25 is mounted for horizontal sliding movement on ways 27 and 28. The first cross slide is mounted for vertical sliding movement on ways 29 on the first carriage 25. The first turret 21 is mounted indexably about axis 23 on the first cross slide 26. A variable speed motor 30 operates through a screw 32 to move the carriage 25 relative to the frame and a variable speed motor 31 operates through a screw 33 to traverse the cross slide 26. This provides two paths of movement for the turret 21 in the first plane, which is vertical in this preferred embodiment.

The second turret 22 is movable in a second plane at an angle to the first plane. This angle may be between 45° and 90° and in this preferred embodiment is shown as 90° by having the first plane vertical and the second plane horizontal. The second plane contains the spindle axis 16. A second means is provided mounting this second turret 22 for movement on the frame 12 in this second plane. This second mounting means includes a second carriage 35 and a second cross slide 36. The second carriage 35 is mounted for longitudinal sliding movement on the frame 12 on ways 38. The cross slide 36 is mounted for transverse movement on the carriage 35 on ways 39. A variable speed motor 40 acts through a screw 42 to longitudinally reciprocate the carriage 35. A variable speed motor 41 acts through a screw 43 to traverse the cross slide 36 on the carriage 35. The turret 22 is journaled on slide 36 for indexable rotation about the second turret axis 24 which is substantially parallel to the spindle axis 16. In this preferred embodiment this second turret axis 24 is not precisely parallel to the spindle axis 16, instead it is at an angle of about 2° in order to provide tool clearance. As constructed in this preferred embodiment, the first turret axis 23 is horizontal and perpendicular to the spindle axis 16. The second turret axis 24 is horizontal and substantially parallel to the spindle axis 16 and substantially perpendicular to the first turret axis 23.

The first turret 21 has a plurality of toolholders 48 in this case shown as six in number. These toolholders carry a variety of tools such as a drill 49 and a facing tool 50 for working on the axial end of the workpiece 18. Also the toolholders 48 may carrying profiling tools 51 and threading tools 52 for cutting, profiling or threading an internal bore surface of the workpiece 18. Still further, the toolholders 48 may carry suitable tools for operating on the outer peripheral edge of the workpiece 18.

Figure 2:
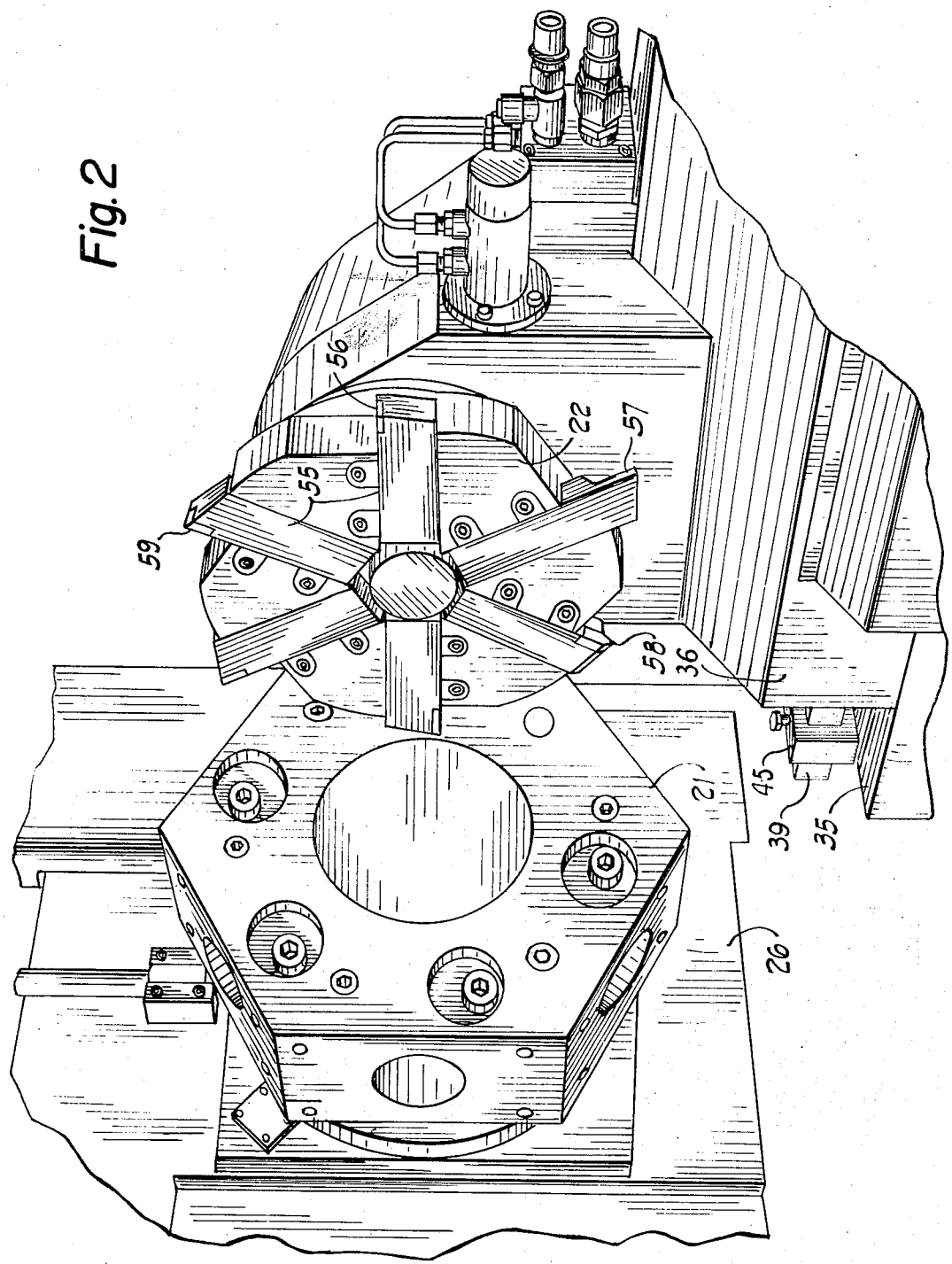
FIG. 2 is an enlarged perspective view of the first and second tool holding turrets with toolholders removed from the first turret.

The second turret 22 is shaped generally as a flat disc as best shown in FIG. 2 and is adapted to mount a plurality of toolholders 55. In this preferred embodiment these are shown as being six in number. The toolholders carry side-working tools 56 to cut or contour the side or outer periphery of the workpiece 18, cut-off tools 57, external threading tools 58 and even may carry end facing tools 59. It has been found through experience that the tools in the first turret 21 may more readily perform endworking functions such as facing, internal boring and threading and the tools in the second turret 22 may more readily perform external contouring, threading and necking operations. In FIG. 2 the tools are shown in the second turret 22 but are not shown in the first turret 21.

The second turret 22 establishes the tools in the toolholders 55 substantially in a third plane perpendicular to the first and second planes. This is an attitude different from the tools in the first turret 21, and materially increases the flexibility of the type of machining permitted by the tools in the two turrets.

Figure 3:
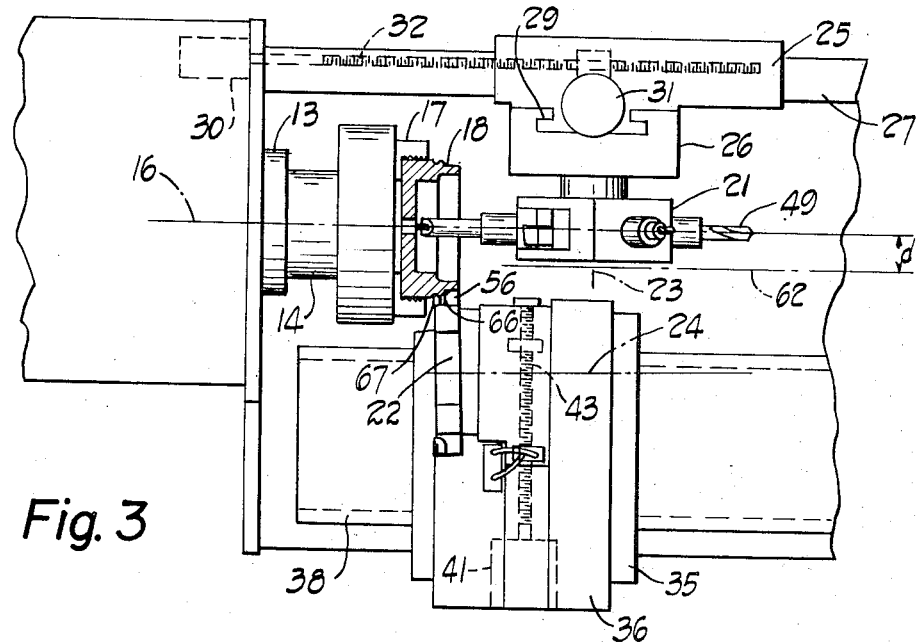
FIG. 3 is a top view of the turrets and spindle of the lathe.
Figure 4:
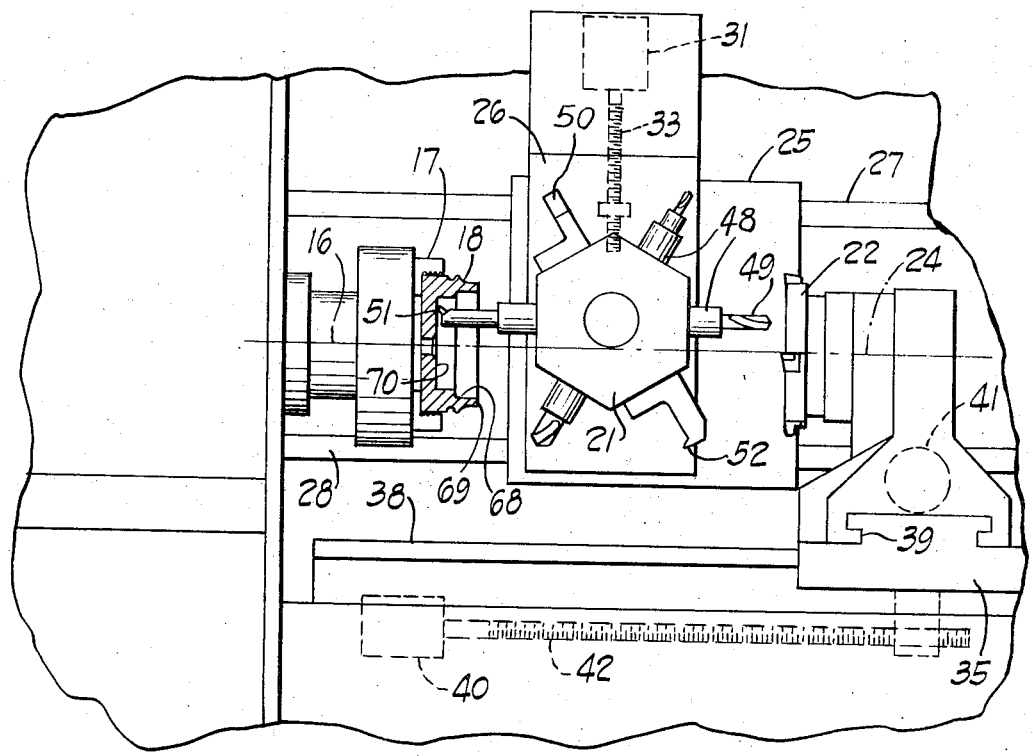
FIG. 4 is a front elevational view of the turrets and spindle of the lathe.

As best shown in FIG. 3, the first turret 21 has a cutting plane which is the first plane and in this top view of FIG. 3 is coincident with the spindle axis 16. The second turret 22 has a cutting plane which is the second plane and in the front view of FIG. 4 is coincident with this spindle axis 16. In this FIG. 4 the second turret 22 has been shown removed to the right by moving the carriage 35 to the right in order to prevent hiding the first turret 21 and workpiece 18 in this particular view. FIG. 3 illustrates that the first turret 21 has a finite thickness. A physical stop 45 is located on the ways 39 or the stop 45 may be on the screw 43 to limit the movement in the second plane of the periphery of the second turret 22 to a minimum distance $d$ from the spindle axis 16. Half the thickness of the first turret 21 is slightly less than this distance $d$. This eliminates any interference between the first and second turrets 21 and 22. The indexing movement of the first turret 21 and the movement thereof in this first plane, by means of carriage 25 and cross slide 26, establishes a first turret movement envelope. The indexing movement of the second turret 22 and the movement thereof in the second plane, by means of carriage 35 and cross slide 36, establishes a second turret movement envelope. As shown in FIG. 3 the first turret movement envelope is above or to the rear of an imaginary plane 62, and the second turret movement envelope is below or in front of this imaginary plane 62. This eliminates interference with each other of these turret movement envelopes. This is an important advantage of the present invention because now the first and second turrets may each have a tool therein working simultaneously on the workpiece 18 for approximately 30–50 percent less machining time. This provides four axes of movement, two axes or two paths of the first turret 21 and two more axes or paths of the second turret 22.

A control system 65 is provided for automatic control of the motion of the tools. This is a numerical control using pre-recorded data, for example, punched paper tape. A tape reader reads blocks or groups of data which selects three things, the proper tool, the proper spindle speed and the proper feed rate. Further, it controls the proper coordinated movements of the two slides on which the particular tool is mounted to provide full contouring capabilities and full thread cutting capabilities. Thread cutting requires not only a particular feed movement of a slide but also a coordinated spindle speed to get the proper lead of thread being cut. Additionally, this numerical control permits the spindle speed to be changed not only between cuts but also during the time that the tool is actually cutting chips from the workpiece. This permits constant surface cutting speed when cutting on a changing radius, thus establishing superior machining.

FIGS. 3 and 4 illustrate that a complex workpiece may be machined. FIG. 3 illustrates that a side-working tool 56 may move along two axes in the horizontal second plane to provide any desired external contour 66 including necking at 67. Also a single point tool may provide external threading by proper feed rate for a particular spindle speed. FIG. 4 illustrates that a profiling tool 51 may move along two axes in the first plane to machine an internal contour 68 which can include the end face 69 as well as an internal face 70. Also internal threading may be performed with a single point tool or tap with coordinated feed and spindle feeds.

The numerical control for automatic control of the lathe 11 is provided not merely for one turret but for both turrets. This permits simultaneous cutting with two tools, one in the front turret and one in the rear turret. This was heretofore not possible with the turret lathes which had two turrets but with both turrets mounted on a single cross slide on a single carriage. This meant that in such former machines there was only a single cutting plane and whereas there was no interference between the two turrets because mounted on the same slide, that slide has to be larger to carry the two turrets and had to move from one general position to another general position in order to cut with the first turret and then cut with the second turret. The present invention is considerably superior by providing extra tools and using them simultaneously rather than consecutively for materially shorter machining time. The tool turret movement envelopes being non-interfering means that the programmer who establishes the prerecorded data need have no fear of breaking a tool or toolholder by any such interference. The two machining functions of the two turrets can be programmed independently without such fear of interference. Computer programming is also possible and with today's methods, is even faster than manual programming. The computer programming can intermix the two tape programs of the two turrets to achieve machining simultaneously with two tools where the same spindle speed has been programmed. Feed speeds, of course, are completely independent and the possible motions of the tools in the two turrets are completely independent. This achieves a 30–50% shorter machining time as compared with standard two-axis lathes. The numerical control of the functions of the turret lathe 11 permit random tool selection instead of merely sequential tool selection, as would be the case if the machine were cam controlled. By providing the turrets 21 and 22 moving in two different planes, the toolholders 48 may be made shorter than if the two turrets were in a single cutting plane. The reason for this is that in the prior art construction with the turrets moving in the same plane, then the toolholders in one turret must reach over past the other turret. This means that they must be long. The long length thereof means greater deflection or else the entire turret and support must be made of larger diameter to get the same rigidity. If made larger, this means increased cost as well as slower cycle times for indexing, and feed and traverse movements of the carriage and cross slide. Still further, in the prior art design where the toolholders of one turret had to reach past the other turret, it was usually impractical to make the turret a six-sided turret, instead it was usually a five-sided turret in order to permit better nesting together of the two turrets.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A turret lathe, comprising in combination,
a frame,
a headstock journaling a spindle about a spindle axis on said frame,
chuck means to grip a workpiece for rotation with said spindle,
first and second tool carrying turrets journaled for indexing about first and second turret axes, respectively,
first means mounting said first turret on said frame for movement in a first plane transverse to its axis and containing said spindle axis,
second means mounting said second turret on said frame for movement in a second plane parallel to its axis and containing said spindle axis,
said first plane being substantially perpendicular to said second plane, means for establishing said first turret axis substantially perpendicular to said second turret axis,
the indexing movement of said first turret and the movement thereof in said first plane establishing a first turret movement envelope,
the indexing movement of said second turret and the movement thereof in said second plane establishing a second turret movement envelope,
and means limiting movement in said second plane of said second turret for elimination of interference with each other of said turret movement envelopes.

2. A turret lathe as set forth in claim 1, wherein said planes intersect along a line substantially at said spindle axis.

3. A turret lathe as set forth in claim 1, wherein said second mounting means establishes said second turret axis transverse to said first turret axis and substantially parallel to said second plane.

4. A turret lathe as set forth in claim 1, wherein said second mounting means establishes said second turret axis substantially perpendicular to said first axis and substantially parallel to said second plane.

5. A turret lathe as set forth in claim 1, including means holding a plurality of tools in said first tool-carrying turret with the toolholders lying in said first plane and acting on an end and internally of a workpiece in the spindle,
and means holding a plurality of tools in said second tool carrying turret with the toolholders in a third plane substantially perpendicular to each of said first and second planes to work on the outer periphery of a workpiece in the spindle.

6. A turret lathe as set forth in claim 1, wherein said movement limiting means limits movement of said second turret to a minimum distance d from said spindle axis, and wherein said first turret and toolholding means therein has a thickness dimension from said spindle axis toward said second turret which thickness dimension is less than said distance d to eliminate interference with each other of said first and second turrets.

7. A turret lathe as set forth in claim 1, wherein said second turret axis is substantially parallel to said spindle axis and said first turret axis is perpendicular to said spindle axis.

8. A turret blade, comprising in combination,
a frame,
a headstock journaling a spindle about a spindle axis on said frame,
chuck means to grip a workpiece for rotation in said spindle,
first and second tool carrying turrets journaled for indexing about first and second turret axes, respectively,
first means mounting said first turret on said frame for movement in a first plane transverse to its axis and containing said spindle axis,
second means mounting said second turret on said frame for movement in a second plane parallel to its axis and containing said spindle axis,
said first plane being substantially perpendicular to said second plane, means for establishing said first turret axis substantially perpendicular to said second turret axis,
and means providing automatic control of movements in two paths in each of said first and second planes for said first and second turrets, respectively.

9. A turret lathe as set forth in claim 8, including said first turret axis being perpendicular to said first plane, means holding a plurality of tools in said first tool carrying turret with the toolholders lying in said first plane,
means holding a plurality of tools in said second tool carrying turret with the toolholders substantially in a third plane perpendicular to said first and second planes,
and means limiting movement in said second plane of the periphery of said second turret to a minimum distance *d* from said spindle axis for elimination of interference with each other on said first and second turrets.

10. A turret lathe, comprising in combination,
a frame,
a headstock journaling a spindle about a spindle axis on said frame,
chuck means to grip a workpiece for rotation with said spindle,
first and second tool carrying turrets journaled for indexing about first and second turret axes, respectively,
first means mounting said first turret for movement on said frame in a first plane containing said spindle axis with said first turret axis substantially perpendicular to said first plane,
second means mounting said second turret for movement on said frame in a second plane containing said spindle axis with said second turret axis substantially parallel to said second plane,
said first plane being substantially perpendicular to said second plane,
means for holding a plurality of tools in said first tool carrying turret with the tool holders lying in said first plane and acting on an end and internally of a workpiece in the spindle,
means for holding a plurality of tools in said second tool carrying turret with the toolholders in a third plane substantially perpendicular to each of said first and second planes to work on the outer periphery of a workpiece in the spindle,
the indexing movement on said first turret and the movement thereof in said first plane establishing a first turret movement envelope,
the indexing movement of said second turret and the movement thereof in said second plane establishing a second turret movement envelope,
and means limiting movement in said second plane of said second turret for elimination of interference with each other of said turret movement envelopes.

* * * * *